March 13, 1934.    P. F. SCOFIELD    1,950,753
MEANS FOR AND METHOD OF MAGNETIZING MAGNETO FIELD MEMBERS
Filed Dec. 9, 1932
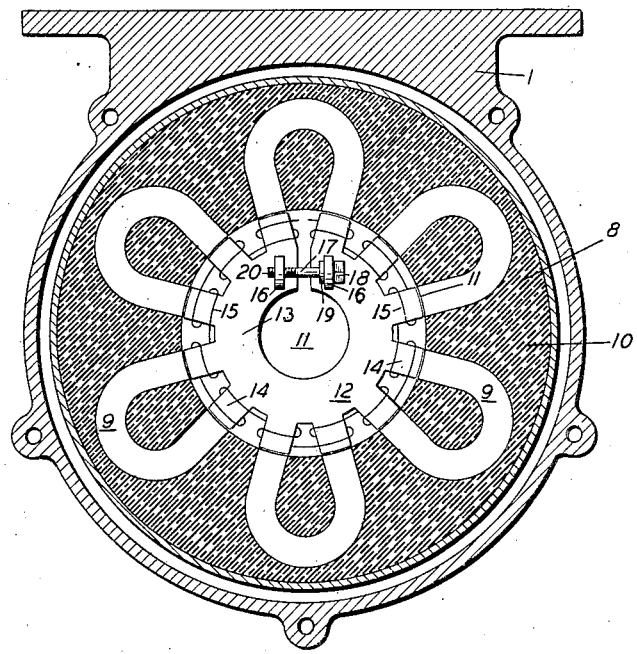
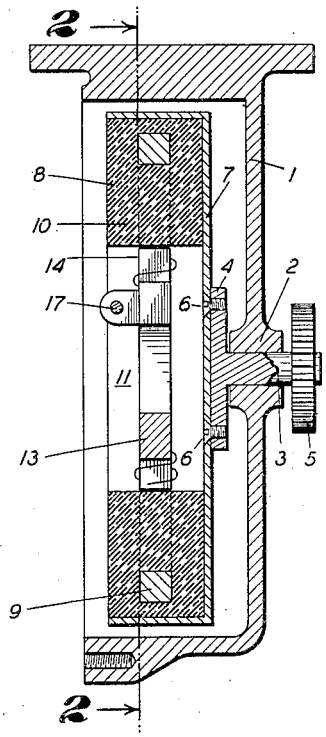
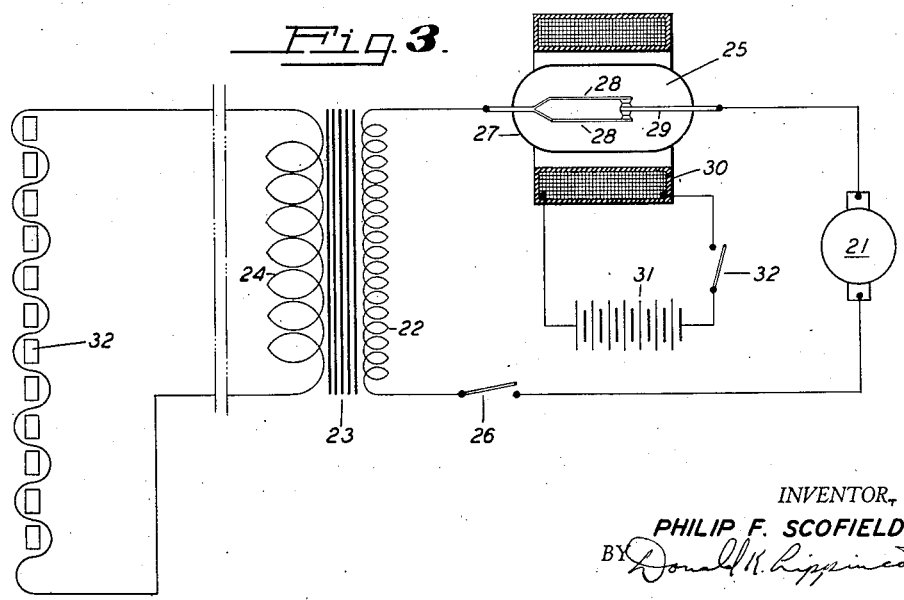
INVENTOR,
PHILIP F. SCOFIELD.
BY
ATTORNEY Patented Mar. 13, 1934

1,950,753

UNITED STATES PATENT OFFICE 1,950,753

MEANS FOR AND METHOD OF MAGNETIZING MAGNETO FIELD MEMBERS

Philip F. Scofield, Palo Alto, Calif., assignor to Heintz & Kaufman, Ltd., San Francisco, Calif., a corporation of Nevada Application December 9, 1932, Serial No. 646,411

4 Claims. (Cl. 171—252)

My invention relates to a means for magnetizing magneto fields and more particularly to a removable charging unit which can be substituted for the magneto armature.

Among the objects of my invention are: to provide a means for fully charging the permanently magnetizable elements of a magneto field without removing the field from the magneto; to provide a removable charging unit which can be substituted for the armature in a magneto having a field containing permanent magnets; to provide a removable charging unit which can be placed in the armature space in a magneto, and distorted to contact the salient poles of the magneto field; and to provide a means for charging cobalt chrome magnets after being assembled in a unitary magneto field structure.

Other objects of my invention will be apparent or will be specifically pointed out in the description forming a part of this specification, but I do not limit myself to the embodiment of my invention herein described, as various forms may be adopted within the scope of the claims.

In the drawing, which illustrates one embodiment of my invention as applied to a rotating field magneto alternator, Figure 1 is a transverse sectional view of an alternator having a rotating field, showing the charging unit in place.

Figure 2 is a cross-sectional view taken along a plane indicated by the line 2—2 in Figure 1.

Figure 3 is a schematic diagram of a circuit employed to obtain a heavy instantaneous charging current.

Modern cobalt chrome magnet steels offer an opportunity for the production of high efficiency magnetos and alternators, when used for the magnetic elements of a field. It is desirable to rotate the field, rather than the armature and, in order to endure high rotational stresses, the magnets must be securely held in position; preferably by molding into a solid unitary structure using a phenolithic condensation product as a filter. Such a field is described in the copending application of Ralph M. Heintz for a magneto field, filed December 9, 1932, Serial No. 646,407.

In such assemblies it is not possible to charge the magnets fully before assembly, as the heat of the molding process, combined with the incident handling, causes the magnets to lose a part of their charge. It is therefore necessary to charge the field elements after assembly. The same problem arises when the field is formed from a unitary block of steel as described in the application of Philip F. Scofield for Magneto field, Serial No. 641,472, filed November 5, 1932.

In fact, any such field structures will gain efficiency from being charged after assembly, and preferably after being assembled in position in the generator.

Broadly speaking, my invention comprises a removable charging unit preferably having a split core, which can be substituted for the armature in a magneto, and then distorted, expanded or contracted as may be necessary, to eliminate all arc gaps and place the salient poles of the field in intimate contact with the poles of the charging unit. A heavy instantaneous current may then be passed through the charging unit and the magnets thus fully charged. The unit may then be allowed to take its original size, removed, and the armature placed in position. The device is also used for recharging at any time by removal of the armature only, it not being necessary to remove the field.

Referring to the drawing, a generator casing 1 is provided with a bearing 2, which carries a generator shaft 3, having a face plate 4 inside the casing, and a gear 5 outside. The casing 1 may be an integral part of the prime mover if desired, and the shaft may be driven in any other convenient manner.

Fastened to the face plate 4 by screws 6, is a drive web 7, which supports a unitary field structure 8, which comprises, in this case, six permanent magnets 9 embedded in moldable non-magnetic material 10. These magnets are preferably of cobalt chrome or other highly efficient magnet steels, and have their salient poles faced off and presented to an interior armature channel 11.

The armature is not shown, and in the space it ordinarily occupies, is a charging unit 12 comprising a split core 13, preferably laminated, having core extensions 14 radiating outwardly, on which are mounted charging coils 15, connected in series and the leads brought out. I prefer to make these coils of a few turns of fairly large diameter wire, but this is not essential as an instantaneous charging current is used.

The split core is normally slightly smaller than the armature space and slips in easily. The two ends of the core are provided with a pair of outwardly extending brackets 16—16, one of which is threaded, the other having a plain hole therein. An expanding screw 17 is fitted in the plain hole, held in position by a hexagonal head 18 on one side, and a thrust flange 19 on the other. The threaded end 20 of this screw engages the threaded bracket. When this screw is turned the split will be widened and the core will be distorted enough to close the air gaps.

In practice, the charging unit is provided with the same number of core extensions and coils as there are salient poles in the field to be charged, in this case 12. The screw 17 is turned to reduce the size of the unit, it is placed in the armature space, and expanded to fit the space. It is of course necessary to located the core extensions opposite the salient poles, so that when the core is expanded, there is an intimate fit and good contact between the core and field elements.

A heavy instantaneous current is then passed through the charging unit coils, the charging unit is removed and the field is ready for use.

I prefer to obtain the charging current from a circuit shown diagrammatically and reduced to lowest terms in Figures 3. A D.C. generator 21 feeds the primary 22 of a step-down transformer having a heavy core 23 and a low resistance secondary 24.

A vacuum break 25 and a working switch 26 are included in the primary circuit. The vacuum break comprises an evacuated envelope 27 enclosing a pair of soft iron arms 28—28, normally contacting a connector bar 29. A solenoid 30 is slipped over the envelope and when the solenoid is energized by a battery 31 under control of a solenoid switch 32, the arms magnetize and repel each other.

To operate, the secondary is connected to the charging unit, indicated in the diagram by the numeral 32. Current is started through the primary from the generator, and after allowing time for the core to build up as dense a field as possible, the solenoid switch is closed, the arms become magnetized and fly apart to break the primary circuit. A heavy instantaneous current will flow in the secondary due to the collapsing core field. This current passes through the charging unit, and the magnets become fully charged.

Approximately 2000 amperes can be obtained in this manner, and as the current is practically instantaneous, it does not have time to heat up the charging coils, thus allowing the use of relatively small wire and a large number of ampere turns.

If the alternator is built with an inside field, having the armature space on the outside, a similar charging unit may be used with inwardly projecting core extensions, by contracting the core on the field to make contact with the faces.

I claim:

1. Means for charging the assembled magnetic elements of a magneto field member which comprises a removable split core having core extensions spaced to cooperate with the salient poles of said magnetic elements, coils mounted on said extensions, and means for distorting said core to cause said core extensions to make intimate contact with said salient poles.

2. Means for charging the assembled magnetic elements of a magneto field member which comprises a removable split core having core extensions spaced to cooperate with the salient poles of said magnetic elements, coils mounted on said extensions, means for distorting said core to cause said core extensions to make intimate contact with said salient poles, and means for passing a heavy instantaneous charging current through said coils.

3. Means for charging the assembled magnetic elements of a magneto field member which comprises a removable split core having core extensions spaced to cooperate with the salient poles of said magnetic elements, coils mounted on said extensions, and screw means bridged across the split to expand and contract said core to allow its insertion or removal from said field member.

4. The method of charging the assembled magnetic elements of a rotating magneto, which comprises removing the armature, placing a charging unit in the armature space, distorting the charging unit to contact said magnetic elements, passing a heavy instantaneous current through said charging unit, removing the charging unit and inserting the armature in its original position.

PHILIP F. SCOFIELD.